Nov. 11, 1958   F. L. MURDOCK, SR., ET AL   2,860,082
METHOD OF EMBEDDING AND SEALING A PLURALITY OF
BOLT HEADS IN A PROTECTIVE BODY
Filed June 15, 1953   2 Sheets-Sheet 1

INVENTORS.
Forrest L. Murdock, Sr.
Herbert D. Boggs
Clement T. Beeson
BY
ATTORNEY.

Nov. 11, 1958   F. L. MURDOCK, SR., ET AL   2,860,082
METHOD OF EMBEDDING AND SEALING A PLURALITY OF
BOLT HEADS IN A PROTECTIVE BODY
Filed June 15, 1953   2 Sheets-Sheet 2

INVENTOR.
Forrest L. Murdock, Sr.
Herbert D. Boggs
Clement T. Beeson
BY
ATTORNEY.

United States Patent Office 2,860,082
Patented Nov. 11, 1958

2,860,082

METHOD OF EMBEDDING AND SEALING A PLURALITY OF BOLT HEADS IN A PROTECTIVE BODY

Forrest L. Murdock, Sr., Herbert D. Boggs, and Clement T. Beeson, Tulsa, Okla., assignors to Plastic Products Corporation, Tulsa, Okla., a corporation Application June 15, 1953, Serial No. 361,556

3 Claims. (Cl. 154—110)

This invention relates broadly to the petroleum industry and has to do with equipment such as storage tanks used therein. More particularly, the invention relates to a structural member forming a part of such storage or stock tanks and similar equipment, the primary object being to improve upon the invention of our co-pending application entitled "Non-Corrosive Tank for Petroleum Products."

In our aforementioned co-pending application, it is explained that we have discovered the adaptability of synthetic plastics such as thermosetting resins for use in the construction of equipment used in the petroleum industry to take the place of steel and other metals heretofore universally employed for the purpose.

The many advantages arising from the use of such new material include primarily, the long-lasting qualities of the resins since there is a rather wide field of selection that includes substantances that are highly resistant to corrosion particularly adverse chemical reaction of the petroleum products themselves, as well as moisture.

It was further explained that while the individual panels of the tank or other equipment may be made from such synthetic products, the advantages emanating therefrom would be completely offset if such panels were not joined by structure of itself capable of resisting corrosion and, therefore, having long-lasting qualities. It is also to be desired that the means for interconnecting the panels be in the nature of a structural member to supply the necessary strength in the overall construction.

It is the most important object of the present invention therefore, to improve upon the invention of our said co-pending application by the provision of a structural member that includes a plurality of bolts or other suitable fastening elements for joining the over-lapped panels of the storage tank or the like, the bolts being held in predetermined, spaced relationship through the medium of a strong, lightweight, protective body having the heads of the bolts completely embedded therein and, therefore, sealed against the deleterious action of corrosion.

Another equally important object of this invention is to provide a structural member wherein the body is composed of a reinforcement in the nature of a mat of glass fibers thoroughly impregnated with a binding material presenting an elongated body for holding the bolts in proper relationship, and for protecting the heads thereof against contact by the oil or other petroleum products within the storage tank.

Another important object hereof lies in the manner of bringing the glass mat into engaging relationship not only with the shanks of the bolt, but with the heads thereof so that when the binding material is distributed evenly throughout the porous mass, the heads of the bolts will not only be held against rotative movement, but will be completely sealed in throughout and particularly around the shank adjacent the heads.

Another object hereof is to provide a structural member that includes the aforementioned body made up of glass fibers, and a thermosetting resin, such reinforcing material including a perforated strip for receiving the shanks of the bolts and engaging opposed surfaces of the bolt heads so as to hold the said heads firmly in place when the binding material is set and in securing relationship to the fibers of the mat.

Other important objects include the way in which one of the strips of the reinforcing material is folded into engagement with not only the inner face of the bolt heads, but with opposed sides thereof; the way in which a second strip of glass fibers is placed upon the outermost faces of the heads; the manner of compressing the strips and the binding material tightly around the bolt heads while the binding material hardens; and many additional objects including the novel steps of producing the structural member hereof, all of which will be made clear as the following specification progresses.

Figure 1:
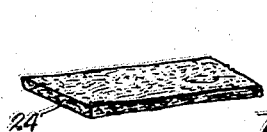
Figure 1 is a perspective view of one of the elongated strips of reinforcing matting forming a part of the body of the structural member constituting the subject matter of this invention showing the same in its initial flat condition.

The structural member forming the subject matter of the present invention as shown in Figs. 8 to 11 inclusive, is broadly designated by the numeral 12 and includes an elongated, strong, lightweight, protective body 14, and a plurality of bolts 16, each having an elongated, externally threaded shank 18, and a head 20 on one end of the shank 18 in the usual manner. It is to be preferred that the heads 20 be polygonal as shown, since when the member 12 is completed, body 14 will more effectively hold the shanks 18 against rotation when a nut is applied thereto than if round-headed bolts are used. It is to be understood however, that the particular type of fastening element utilized and mounted on the body 14, is of itself not particularly important and may be varied to suit the desires of the manufacturer.

It is noted in Figs. 8 to 11 inclusive, that the heads 20 are completely embedded within and sealed by the body 14 and such is of extreme importance to the present invention when it is considered that the structural members 12 are disposed within the storage tanks or other equipment with which the same are used and thereby subjected to the action of the petroleum products which would normally corrode the heads of the bolts, but which has no deleterious effect upon the body 14.

As a matter of further explanation, there is a definite distinction in the field between bolted tanks and those utilizing welded seams to hold the panels and other sections of the tank together. Manifestly, this invention relates to the bolted type of tank and the elongated structural member 12 is employed to join the overlapping panels with the member 12 on the inner face of the tank, the shanks 16 extending through the aligned openings of the overlapping panels and with nuts on each of the shanks 18 exteriorly of the tank for drawing the panels tightly together and for clamping the structural member 12 tightly against the innermost face of the tank.

The members 12 may be made in predetermined lengths ready for use or in lengths best suited to carry out the method of manufacture for subsequent severance to fit. In this respect therefore, a length may be cut to present individual bolts for use separately in the construction of the equipment as desired. It is to be further initially understood that while the member 12 is shown with the bolts 16 spaced equally along a rectilinear row extending longitudinally of the member 12, the latter may well take the form of an arc, either in the direction of the row of bolts 16 or transversely thereof, all depending upon the nature of the tank or other equipment to be constructed.

Body 14 consists of a resilient, porous mat made up of a multiplicity of fibers preferably glass, which mass is impregnated with a suitable binding material capable of hardening and when hardened, of securing the fibers together. Such mats made up of glass fibers either arranged haphazardly or in predetermined order, are readily available on the open market.

In accordance with the present invention the mat is first cut to present a pair of elongated, relatively thin strips 22 and 24 of equal length, the strip 24 however, being appreciably wider than the strip 22 and being provided with a longitudinal row of perforations 26 on the longitudinal axis thereof. While perforations 26 are normally equally spaced and in alignment, their arrangement may vary within the scope of our present invention.

Figure 2:
Fig. 2 is a perspective view of said reinforcing strip showing a pair of bolts inserted into corresponding perforations formed therein.

The second step in the manufacture of the member 12 is to thread one of the bolts 16 into each of the perforations 26 respectively in the manner illustrated by Fig. 2 of the drawings. Thereupon, the operator inserts the strip 24 with the bolts 16 thereof in an elongated cavity 28 forming a part of a female die broadly designated by the numeral 30 in the manner illustrated by Fig. 3 of the drawings. Female die 30, chosen for illustration, is provided with a pair of longitudinal cavities 28, it being understood that any number of such cavities may be provided in a single die as desired.

Figure 3:
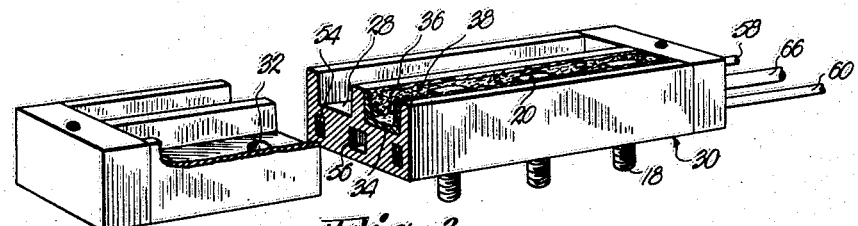
Fig. 3 is a fragmentary, perspective view partially broken away and partially in section of a female die ultilized in carrying out the method of making the structural member hereof showing the strip of Fig. 2 folded therein, and three bolts carried by the strip threaded through the female die.

It is clearly seen in Fig. 3 of the drawings, that each of the cavities 28 is U-shaped in cross-section and open at its top. The bight or bottom wall of each cavity respectively, is provided with a hole 32 for receiving one of the shanks 18. In this respect therefore, the holes 32 are arranged precisely as perforations 26 in the strip 24.

When a strip 24 is placed in a cavity 28 and the shanks 18 threaded into the openings 32, strip 24 will assume the U-shaped, cross-sectional shape of the cavity 28, presenting in the strip 24 therefore, a bight 34 and a pair of opposed, substantially parallel legs 36 and 38. The distance between the side walls of the cavities 28 is chosen so that when the strip 24 and the bolts 16 are inserted in the die 30, the legs 36 and 38 of the strip 24 will engage a pair of opposed surfaces of the polygonal heads 20. When the bolts 16 are pressed firmly into place within the die member 30, the heads 20 will be in tight engagement at their innermost faces with the bight 34 and the latter in turn will lie flatly within the bottom wall of the cavity 28. It is to be preferred further, that the perforations 26 in the strip 24, be just sufficiently large to receive the shanks 18 so that the strip 24 will engage the shanks 18 therearound adjacent the heads 20.

Figure 4:
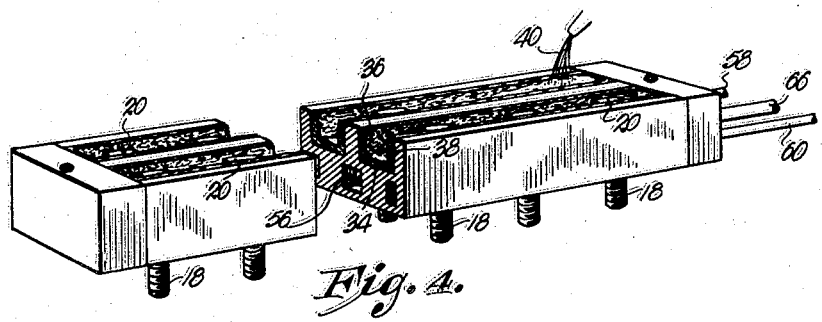
Fig. 4 is a perspective view partially in section similar to Fig. 3 illustrating another step in the method, i. e. the pouring of the binding material.

Figure 4 of the drawings illustrates the next step in the method of producing member 12, namely, that of filling the channel defined by the two legs 36 and 38 and the bight 34, with a suitable binding material 40. As above indicated, the binder 40 is preferably a synthetic plastic in the nature of a thermosetting resin. Many polyester resins such as polystyrene have proved satisfactory. The degree of flexibility of the resin may be chosen to suit the desires of the manufacturer, but it has been found that an "all flexible" resin is not as desirable as one that is mostly rigid.

Manifestly, in preparing the binder 40, the resinous component thereof must be strengthened with a suitable plasticizer to provide the necessary strength and stiffness in the binder 40. In this connection therefore, many types of fillers such as clay or other pigmented materials may be used.

It may be made clear at this point that one important advantage of structures made from synthetic resins is the fact that the same need not be periodically painted as in the case of steel and other metals, and a desired color may be attained by proper admixing of the binder 40. By way of example, titanium dioxide admixed with the resin, produces a suitable color for this particular field.

Another factor to be considered in producing the binder 40 is that of controlling its viscosity. Obviously, it is to be preferred that the same be capable of pouring into the molds or dies in the manner illustrated in Fig. 4 of the drawings, and at the same time be sufficiently liquid to fully impregnate the fibrous strips 22 and 24. By controlling the viscosity, voids can be eliminated in the hardened body 14 and excessive flash around and between the dies, as well as through the openings 32 around the shanks 18, can be eliminated.

Figure 5:
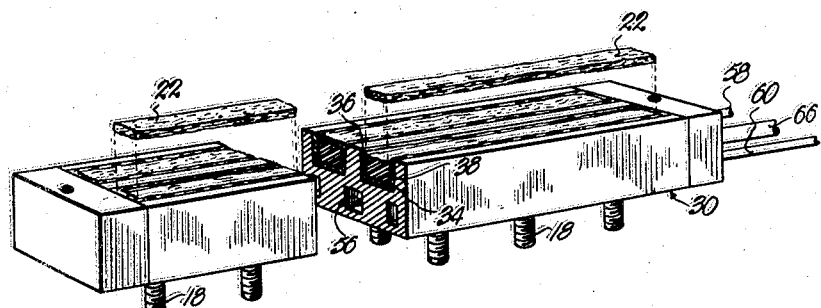
Fig. 5 is a perspective view partially in section similar to Figs. 3 and 4, illustrating the step of placing another strip upon the binding material in the female die.

After pouring of the binder 40 into the mold 30 as illustrated in Fig. 5 of the drawings, the elongated strip 22 is placed thereon. It is to be preferred that the width of the strip 22 be substantially the same as the distance between the inner faces of legs 36 and 38 to the end that the strip 22 fully bridges said legs at the uppermost edges thereof.

Figure 6:
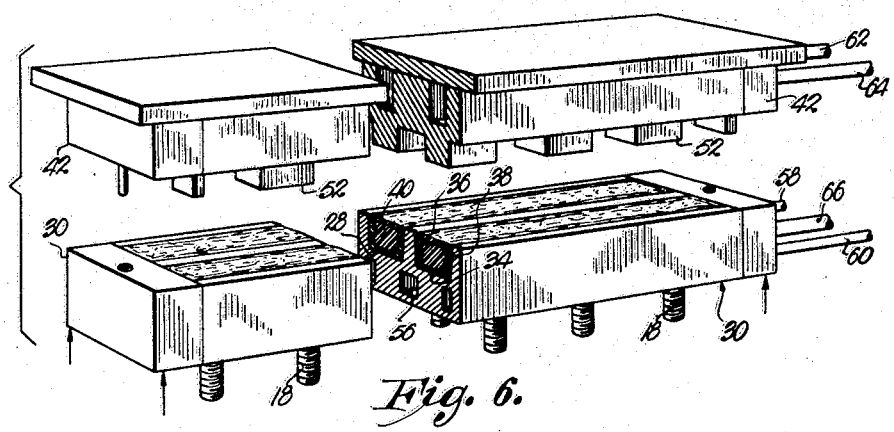
Fig. 6 is a stretched-out, perspective view partially in section showing both the female and the male dies with the glass fiber strips and binding material ready for compression.

Fig. 6 of the drawings shows the strip 22 in place and shows further, a suitable male die 42 positioned above the die 30 ready for compression of the binder 40 and the two strips 22 and 24 tightly around the heads 20 of bolts 16. While in some applications it may be satisfactory to eliminate the legs 36 and 38 and more often to merely press the strip 22 tightly against the outermost faces of the heads 20, it is to be preferred that the strip 22 also be shaped and pressed tightly against a second pair of opposed, flat surfaces of the heads 20 presenting a bight 44 and a pair of legs 46 and 48 in the strip 22 for each head 20 respectively, as shown most clearly in Figs. 9 to 11 inclusive, the heads 20 therefore, being separated by a plurality of polygonal cavities 50 extending longitudinally of the member 12 and in opposed relationship to the outwardly extending shank 18.

Figure 7:
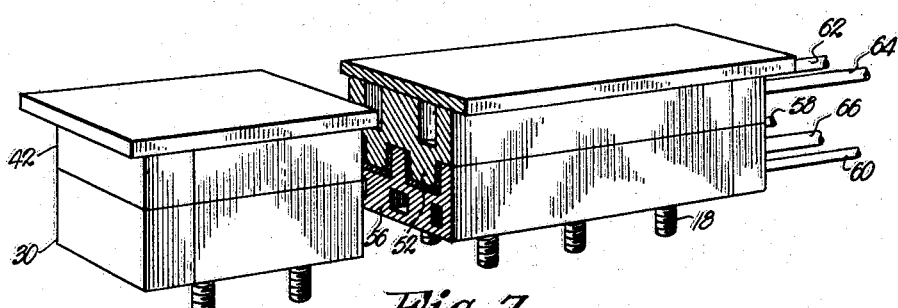
Fig. 7 is a perspective view partially in section similar to Fig. 6 but illustrating the die members in interlocked relationsihp compressing the binding material and fibrous strips.

To this end therefore, the male die 42 is provided with a plurality of spaced, polygonal lugs 52 for each cavity 28 respectively. Thus, when the dies 30 and 42 are brought together with force as shown in Fig. 7, by movement for instance of the female die upwardly in the direction of the arrows in Fig. 6, the heads 20 of the bolts will be received between the lugs 52 of male die 42. The dies 30 and 42 are held tightly interlocked as shown in Fig. 7, during the setting of the binder 40, and it is seen that these dies operate effectively in forcing the binder 40 through the glass fibers of the strips 22 and 24 to distribute the binder 40 therethrough in complete impregnating-relationship to all of the fibers, whereby when the binder 40 is "set," such fibers will all be secured together. The pressure of the die 30 against the die 42 will also compress the material 40, as well as the strips 22 and 24, tightly around the heads 20 and against all six surfaces thereof. Such pressure will additionally cause the binder 40 to flash outwardly through the holes 32 of the female die 30, around the shanks 18 adjacent the heads 20, thereby completely sealing the heads 20 within the body 14. It is pointed out that such flashing may be easily removed from the threads of the shanks 18 through use of a suitable chaser.

The speed of producing the member 12, may be increased through employment of heat for setting of the binder 40. To this end therefore, die members 30 and 42 are provided with channels 54 and 56 respectively therethrough, having inlet and outlet tubes 58—60 and 62—64 respectively for the continuous flow of hot oil or other fluid. It is advisable to avoid high temperature in the oil passing through the female die 30 so that the binder 40 will not tend to "set up" prior to bringing the die members 30 and 42 together as shown in Fig. 7.

The manner of applying force to the die members in carrying out the step shown in Fig. 7, is of no consequence to this invention, but by way of example, inflatable tubes may be disposed beneath the stationary die 42 for receiving the female die 30 and raising the same in the direction of the arrows of Fig. 6 upon inflation of the tubes by direction of a suitable fluid thereinto. Figs. 3 to 8 inclusive show a rod 66 on the female die 30 for purposes of reciprocating the same to and from the position beneath the male die 42.

Figure 8:
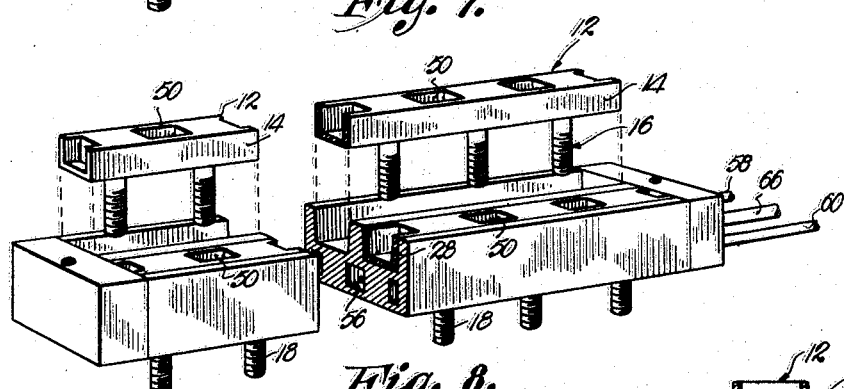
Fig. 8 is a perspective view partially in section similar to Figs. 3 to 5 inclusive and showing the manner of removing one of the completed structural members from the female die.
Figure 11:
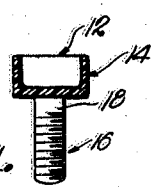
Fig. 11 is a transverse, cross-sectional view taken on line XI—XI of Fig. 9.
Figures 9, 10:
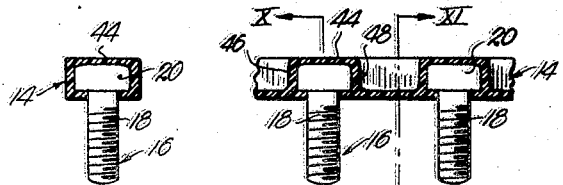
Fig. 9 is a fragmentary, longitudinal, cross-sectional view taken through a finished structural member.
Fig. 10 is a transverse, cross-sectional view taken on line X—X of Fig. 9.

After the binder 40 has set, the female die 30 is lowered and removed from beneath the male die 42, whereupon, the completed member 12 is removed from the cavity 28, and in this respect, any suitable instrumentality may be provided for pressing upwardly on the bolts 16 to raise the member 12 above the female die as shown in Fig. 8.

It is now seen that all of the aims and objects of this invention, as initially set forth herein, are fulfilled through the provision of a structural member 12, made as above specified and by following the steps of the method that has been made clear as the specification progressed.

The primary aim of completely covering and protecting the heads 20 of the bolts, even to the extent of providing a tight seal around the shanks 18 adjacent the inner faces of the heads 20, is clearly fulfilled. Additionally, the heads 20 are held firmly in place and cannot be easily torn loose from the body 14 since, when the structureal member 12 is clamped in place, the inner faces of the heads 20 will further clamp the impregnated bights 34 against the inner face of the tank or other equipment.

Such firm embedding of the heads 20, further facilitates quick assembly in that the elongated member 12 is sufficiently flexible for easy insertion of the bolts into the openings of the overlapped panels and the bolts will not rotate with respect to the body 14 when nuts are applied to the shanks 18.

Finally, the entire member 12 has a high degree of tensile strength and serves the function of reinforcing the panels themselves in cooperation with the clamping action of the bolts when the member 12 is applied as above described.

Having thus described the invention what is claimed as new and desired to be secured by Letters Patent is:

1. The method of making a structural member, said member including a plurality of bolts having elongated shanks and polygonal heads, said heads being provided with a first and a second pair of opposed sides, said method including the steps of inserting the shanks of the bolts in the perforations of an elongated, perforated strip of fibrous, reinforcing material to bring said shanks into engagement with the strip; folding said strip along said first pair of opposed sides of the heads; encasing the heads and simultaneously impregnating the fibers of the strip with a binding material capable of hardening and adapted to secure said fibers together when hardened; placing a second strip of fibrous, reinforcing material on the heads in opposed relationship to said shanks; and compressing the strips and said binding material tightly against said heads and simultaneously folding the second strip along said second pair of opposed sides of the heads, while the binding material sets, to distribute said binding material throughout the strips.

2. The method of making a structural member, said member including a plurality of bolts having elongated shanks and polygonal heads, said heads being provided with a first and a second pair of opposed sides, said method including the steps of inserting the shanks of the bolts in the perforations of an elongated, perforated strip of glass fibers to bring said shanks into engagement with the strip; folding said strip along said first pair of opposed sides of the heads; encasing the heads and simultaneously impregnating the fibers of the strip with a thermosetting binding material adapted to secure said fibers together when set; placing a second strip of glass fibers on the heads in opposed relationship to said shanks; and compressing the strips and said binding material tightly against said heads and simultaneously folding the second strip along said second pair of opposed sides of the heads, while the binding material sets, to distribute said binding material throughout the strips.

3. The method of making a structural member, said member including a plurality of bolts having elongated shanks and polygonal heads, said heads being provided with a first and a second pair of opposed sides, said method including the steps of inserting the shanks of the bolts in the perforations of an elongated, perforated strip of glass fibers to bring said shanks into engagement with the strip; folding said strip along said first pair of opposed sides of the heads; encasing the heads and simultaneously impregnating the fibers of the strip with a thermosetting binding material adapted to secure said fibers together when set; placing a second strip of glass fibers on the heads in opposed relationship to said shanks; compressing the strips and said binding material tightly against said heads and simultaneously folding the second strip along said second pair of opposed sides of the heads, while the binding material sets, to distribute said binding material throughout the strips; and heating the binding material while compressed to speed the setting thereof.

References Cited in the file of this patent

UNITED STATES PATENTS

| 859,934 | Freschl | July 16, 1907 |
| 1,375,733 | Sanford | Apr. 26, 1921 |
| 2,326,455 | Gray | Aug. 10, 1943 |
| 2,607,756 | Anderson | Aug. 19, 1952 |
| 2,654,685 | Voelker | Oct. 6, 1953 |
| 2,672,176 | Lyijynen | Mar. 16, 1954 |
| 2,715,596 | Hawley | Aug. 16, 1955 |

FOREIGN PATENTS

| 643,538 | Great Britain | Sept. 20, 1950 |

OTHER REFERENCES

Modern Plastics, May 1951 issue, pages 64–67.